United States Patent [19]

Grey

[11] Patent Number: 5,210,163

[45] Date of Patent: May 11, 1993

[54] PROCESS FOR PREPARING ALTERNATING COPOLYMERS OF OLEFINICALLY UNSATURATED SULFONATE SALTS AND UNSATURATED DICARBOXYLIC ACID ANHYDRIDES

[75] Inventor: Roger A. Grey, West Chester, Pa.

[73] Assignee: Arco Chemical Technology, L.P., Wilmington, Del.

[21] Appl. No.: 767,747

[22] Filed: Sep. 30, 1991

Related U.S. Application Data

[63] Continuation of Ser. No. 534,802, Jun. 7, 1990, abandoned.

[51] Int. Cl.$^5$ ............................................. C08F 2/06
[52] U.S. Cl. ................................. 526/216; 526/220; 526/240
[58] Field of Search .................. 526/216, 217, 220

[56] References Cited

U.S. PATENT DOCUMENTS

| | | | |
|---|---|---|---|
| 3,145,194 | 8/1964 | Heckmaier | 526/93 |
| 3,547,899 | 12/1970 | Arlt | |
| 3,879,288 | 4/1975 | Siegele | 210/701 |
| 4,041,228 | 8/1977 | Gross | 526/240 |
| 4,342,652 | 8/1982 | Schiller et al. | 210/698 |
| 4,640,793 | 2/1987 | Persinski et al. | 252/82 |
| 4,659,793 | 4/1987 | Yang | 526/91 |
| 4,783,501 | 11/1988 | Sasaki et al. | 524/701 |
| 5,000,856 | 3/1991 | Chen et al. | 210/694 |
| 5,032,295 | 7/1991 | Matz et al. | 252/8.51 |
| 5,073,269 | 12/1991 | Denzinger et al. | 210/698 |

FOREIGN PATENT DOCUMENTS

| | | |
|---|---|---|
| 50-149705 | 12/1975 | Japan . |
| 54-50064 | 4/1979 | Japan . |
| 59-213714 | 12/1984 | Japan . |
| 1361642 | 7/1974 | United Kingdom . |

*Primary Examiner*—Christopher Henderson
*Attorney, Agent, or Firm*—Stephen D. Harper

[57] ABSTRACT

Substantially alternating 1:1 copolymers of olefinically unsaturated sulfonate salts such as sodium methallylsulfonate and $\alpha, \beta$-unsaturated aliphatic dicarboxylic acid anhydrides such as maleic anhydride are produced by free radical polymerization using a polar non-reactive organic solvent such as acetic acid. The copolymers and their derivatives are useful as water-soluble dispersants.

1 Claim, No Drawings

PROCESS FOR PREPARING ALTERNATING COPOLYMERS OF OLEFINICALLY UNSATURATED SULFONATE SALTS AND UNSATURATED DICARBOXYLIC ACID ANHYDRIDES

This is a continuation of application Ser. No. 07/534,802 filed on Jun. 7, 1990, now abandoned.

This invention pertains to alternating copolymers of olefinically unsaturated sulfonate salts and $\alpha, \beta$-unsaturated dicarboxylic acid anhydrides and derivatives of such copolymers which are useful as water soluble dispersants. The invention also relates to methods for the preparation of the copolymers.

BACKGROUND OF THE INVENTION

Water-soluble polymers containing pendent sulfonate and/or carboxylate groups have found wide utility as dispersants, scale and corrosion-preventing agents, detergent builders, sequestering agents, suspending agents, flame retardants, and the like. Copolymers containing both sulfonate and carboxylate groups are commonly prepared by copolymerization of unsaturated sulfonated salt monomers and unsaturated dicarboxylic acids or their salt or anhydride derivatives under free radical conditions. To date, however, it has not been possible to obtain substantially alternating copolymers containing approximately equimolar amounts of the comonomers and having reasonably high (i.e., greater than 1500) molecular weights. These difficulties are believed to be due to differences in monomer reactivity and the poor solubility of the comonomers in typical organic solvents.

For example, Jpn. Kokai No. 149,705/75 teaches that copolymers of high molecular weight but containing low levels (<30 mol %) of olefinically unsaturated sulfonic acid recurring units may be produced by polymerizing maleic anhydride with vinyl sulfonic acid or methacrylsulfonic acid in the presence of benzoyl peroxide initiator.

Jpn. Kokai No. 213,714/84 discloses free radical copolymerization of maleic acid or maleic anhydride with an allylic compound such as sodium methallyl sulfonate in aqueous solution or suspension under acidic (pH=2.5-6.0) conditions. The maximum molecular weight obtained was only about 1250.

Jpn. Kokai No. 50064/79 teaches the attempted copolymerization of equimolar amounts of sodium allyl sulfonate and maleic anhydride in 95% ethanol using benzoyl peroxide initiator. The composition and molecular weight of the product obtained are not disclosed, however.

It is clear, therefore, that there is a need for methods by which substantially alternating 1:1 copolymers of olefinically unsaturated sulfonate salts and $\alpha, \beta$-unsaturated dicarboxylic acid anhydrides having a substantial degree of polymerization may be prepared. Copolymers of this type and their derivatives would be expected to have unique and beneficial properties by virtue of the high proportion of pendent sulfonate salt groups present.

SUMMARY OF THE INVENTION

This invention provides a substantially alternating copolymer comprised of recurring polymerized units of an olefinically unsaturated sulfonate salt and recurring polymerized units of an $\alpha, \beta$-unsaturated dicarboxylic acid anhydride having a peak molecular weight of from about 500 to 20,000. The sulfonate salt and dicarboxylic acid anhydride recurring polymerized units are present in approximately equimolar ratio.

Also provided by this invention is a substantially alternating copolymer comprised of (a) from 0 to about 50 mole percent of recurring polymerized units of an olefinically unsaturated sulfonate salt, (b) from 0 to about 50 mole percent of recurring polymerized units of an olefinically unsaturated sulfonic acid; (c) from 0 to about 50 mole percent of recurring polymerized units of an $\alpha, \beta$-unsaturated dicarboxylic acid anhydride, and (d) from about 1 to 50 mole percent of recurring polymerized units of a dicarboxylic moiety wherein the carboxylate functional groups of the dicarboxylate moiety are selected from the group consisting of carboxylic acids, carboxylic acid salts, carboxylic acid esters, and carboxylic acid amides. The total content of (a) and (b) and the total content of (c) and (d) in the copolymer are each about 50 mole percent [i.e., the molar ratio of (a+b):(c+d) is about 50:50]. Recurring polymerized units (a) or (b) alternate with recurring polymerized units (c) or (d). The peak molecular weight of the alternating copolymer is from about 500 to 20,000.

A copolymerization process is also provided by this invention which comprises reacting approximately equimolar amounts of an $\alpha, \beta$-unsaturated dicarboxylic acid anhydride and an olefinically unsaturated sulfonate salt dissolved in a non-reactive polar organic solvent which is not a free radical chain terminator in the presence of an effective amount of a free radical initiator for a time and at a temperature effective to form a substantially alternating copolymer having approximately equimolar amounts of $\alpha, \beta$-unsaturated dicarboxylic acid anhydride recurring polymerized units and olefinically unsaturated sulfonate salt recurring polymerized units and having a peak molecular weight of from about 500 to 20,000.

DETAILED DESCRIPTION OF THE INVENTION

In one aspect of this invention, a copolymer is obtained which is comprised of recurring polymerized units of an olefinically unsaturated sulfonate salt and recurring polymerized units of an $\alpha, \beta$-unsaturated dicarboxylic acid anhydride. The copolymer is substantially alternating in structure. That is, sulfonate salt recurring polymerized units (A) alternate with $\alpha, \beta$-unsaturated dicarboxylic acid anhydride recurring polymerized units (B) in the following manner:

-A-B-A-B-A-B-

While recurring units of the same type may occasionally be adjacent to each other (e.g., -A-A-B-B-A-), it is preferred that the number of such adjacent units be minimized. The olefinically unsaturated sulfonate salt and $\alpha, \beta$-unsaturated aliphatic dicarboxylic acid anhydride recurring polymerized units are consequently present in an approximately equimolar ratio (i.e., about 50 mole percent of each).

The substantially alternating copolymer of this invention has a moderately high molecular weight of from about 500 to 20,000. Most preferably, however, the molecular weight is from about 1500 to 6000. In this context, molecular weight refers to the peak molecular weight measured by gel permeation chromatography relative to sulfonated polystyrene calibration standards.

The olefinically unsaturated sulfonate salt recurring polymerized units may be derived from any polymerizable unsaturated compound containing at least one sulfonate salt functional group. In general, the preferred structure of the olefinically unsaturated sulfonate recurring polymerized units is

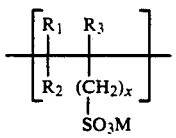

wherein $R_1$, $R_2$, and $R_3$ are the same or different and are independently selected from the group consisting of hydrogen, aryl and $C_1$–$C_6$ alkyl, x is 0, 1, or 2, and M is an alkali metal, alkaline earth or ammonium. In this context, "ammonium" refers to $NH_4$ as well as to organoammonium moieties such as $NHET_3$, $NBu_4$, $NH_3Ph$, and $NH_3Me$. Most preferably, $R_1$ and $R_2$ are hydrogen, $R_3$ is hydrogen or methyl, x is 0 or 1 and M is sodium or potassium since the corresponding monomers (sodium vinyl sulfonate, potassium vinyl sulfonate, sodium allyl sulfonate, potassium allyl sulfonate, sodium methallyl sulfonate, potassium methallyl sulfonate) are readily available and highly reactive when copolymerized with $\alpha$, $\beta$-unsaturated dicarboxylic acid anhydrides under the reaction conditions of this invention. In addition, the alternating copolymers prepared from these preferred monomers have exceptionally high water solubility.

The $\alpha$, $\beta$-unsaturated dicarboxylic acid anhydride recurring polymerized units can be derived from any polymerizable anhydride having a carbon-carbon double bond in conjugation with at least one of the carbon-oxygen double bonds. The $\alpha$, $\beta$-unsaturated dicarboxylic acid anhydride recurring polymerized units preferably have the general structure:

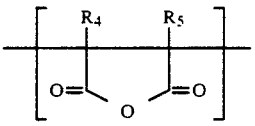

wherein $R_4$ and $R_5$ are the same or different and are independently selected from the group consisting of hydrogen and $C_1$–$C_6$ alkyl. $R_4$ or $R_5$ may also be an aryl group such as phenyl or substituted phenyl. Maleic anhydride (i.e., where $R_4$ and $R_5$ are hydrogen) is the preferred anhydride since it is readily available, highly reactive, and imparts good water solubility to the copolymer. Other anhydrides such as itaconic anhydride, citraconic anhydride, ethyl maleic anhydride, methyl itaconic anhydride, chloromaleic anhydride, bromomaleic anhydride, tetrahydrophthalic anhydride, and mixtures thereof may also be employed, however.

The substantially alternating copolymer described above may be prepared by reacting approximately equimolar amounts of the $\alpha$, $\beta$-unsaturated dicarboxylic acid anhydride and olefinically unsaturated sulfonate salt in the presence of an effective amount of a free radical initiator. The free radical initiator may be a hydroperoxide, persulfate, peroxide, perborate, percarbonate, or azo compound. Preferably, the molar ratio of anhydride:sulfonate is from about 1.1:1 to 1:1.1.

However, azo compounds are most preferred for use in the process of this invention as such initiators tend to more readily yield copolymers having molecular weights in the desired range and having nearly perfectly alternating structures. Illustrative azo free radical initiators include 2,2'-azo-bis-isobutyronitrile(AIBN), 2,2'-azo-bis(2-methyl butane nitrile), 1,1'-azo-1-cyclohexane carbonitrile, 4,4'-azo-4-cyanopentanoic acid, 2,2'azobis-(4-methoxy-2,4-dimethylpentane nitrile), 2,2'-azobis-(2-acetoxy-propane), 2-(tert-butylazo)-2,4-dimethylpentane nitrile, and other azo compounds containing at least one tertiary carbon attached to azo nitrogen. Mixtures of free radical initiators may be used, if desired. The amount of free radical initiator should be sufficient to accomplish substantial copolymerization of the monomers. In general, concentrations of from about 0.1 to 10 weight percent based on the total weight of monomers will be suitable. It may be desirable to add the initiator in portions to the reaction mixture during copolymerization.

To effect copolymerization, the monomers are dissolved in a non-reactive polar organic solvent which is not a free radical chain terminator. The choice of solvent is critical to the preparation of a copolymer having the desired molecular weight, composition, and alternating structure. For example, a nucleophilic solvent such as water, ethanol or another alcohol is unsatisfactory for use since it will tend to react with the anhydride functionality of the $\alpha$, $\beta$-unsaturated aliphatic dicarboxylic acid anhydride monomer. Without wishing to be bound by theory, it is believed that the ability to form the alternating copolymer of this invention is related to the formation of a soluble 1:1 charge transfer complex between the alkenyl sulfonate salt and the $\alpha$, $\beta$-unsaturated dicarboxylic acid anhydride. The presence of the cyclic anhydride functionality in the latter comonomer is thought to be necessary in order for such a complex to form. The solvent used must therefore be sufficiently polar to dissolve this charge transfer complex but not so strong a solvent that it disrupts the complex by solubilizing each component individually or by reacting with the anhydride to form a non-cyclic species. Dimethyl sulfoxide and ethanol, for example, are not suitable solvents for use in the process of this invention. Aliphatic carboxylic acids having from one to three carbon atoms and alkyl amides of $C_1$–$C_3$ carboxylic acids are particularly well suited for use as solvents in the process of this invention. Preferred solvents include acetic acid, propionic acid, dimethyl formamide, dimethyl propionamide, dimethyl acetamide, diethyl formamide, and the like or mixtures thereof. Glacial acetic acid is the most preferred solvent. It is generally desirable to exclude water and oxygen as much as possible during copolymerization. This may be accomplished by keeping the reaction mixture under an inert atmosphere of nitrogen, argon, or the like or by adding a dehydrating agent such as acetic anhydride.

The amount of solvent used should be sufficient to dissolve at least a major portion of the monomers at the reaction temperature employed. In general, the weight of solvent should be from about 1 to 5 times the total weight of monomers. The reaction time and temperature are not critical and will depend on the particular free radical initiator and monomers used. The comonomers are heated for a time and at a temperature effective to accomplish substantial (preferably, over 75%) conversion. Temperatures of from about 50° C. to 125° C. are usually preferred. The copolymerization may be carried out by a batch or continuous process in any suitable vessel, although it is usually desirable to mix the components by agitation.

The substantially alternating copolymer thus produced may be separated from the reaction mixture and isolated by any convenient method known in the art for the recovery of polymers from solution. For example, the copolymer may be precipitated from solution by addition of a suitable quantity of a non-solvent and then collected by filtration, decantation, centrifugation or similar procedures.

In another aspect of this invention, the anhydride functionality of the substantially alternating copolymers of the type hereinabove described may be fully or partially reacted with a suitable reagent to form a copolymer having pendent carboxylate functional groups. The sulfonate salt groups may also be acidified to form pendent sulfonic acid groups. The resulting alternating copolymer products will be comprised of (a) from 0 to about 50 mole percent of recurring polymerized units of an olefinically unsaturated sulfonate salt, (b) from 0 to about 50 mole percent of recurring polymerized units of an olefinically unsaturated sulfonic acid, (c) from 0 to about 50 mole percent of recurring polymerized units of an α, β-unsaturated dicarboxylic acid anhydride, and (d) from about 1 to 50 mole percent of recurring polymerized units of a dicarboxylate moiety wherein the carboxylate functional groups of the dicarboxylate moiety are selected from the group consisting of carboxylic acids, carboxylic acid salts, carboxylic acid esters, and carboxylic acid amides. More than one type of carboxylate functional group may be present. The total amount of (a) and (b) and the total amount of (c) and (d) are each about 50 mole percent [i.e., the molar ratio of (a+b):(c+d) is about 50:50]. The peak molecular weight of the copolymer is from about 500 to 20,000, but more preferably is from about 1500 to 6000.

The carboxylate functional groups may, for example, have the general structure:

wherein Y is O (oxygen) or NZ wherein Z is hydrogen, aryl or $C_1-C_6$ alkyl and X is hydrogen, ammonium, $C^1-C^6$ alkyl, aryl, alkali metal or alkaline earth, with the proviso that when Y is NZ, X is either hydrogen, aryl or $C_1-C_6$ alkyl. For example, YX may be OH, $NH_2$, $NEt_2$, NHMe, ONa, OK, $ONH_4$, NHPh, $OCa_{0.5}$, or the like. "Aryl" in this context means a phenyl or naphthyl which may be substituted with one or more substituents such as alkyl, halo, alkoxy, or other groups. The physical and chemical properties of the resulting copolymer having pendent carboxylate functional groups may be controlled as desired by varying the structure of the functional groups and the degree of conversion of the anhydride groups in the parent copolymer. Any conventional method of converting anhydride functional groups to carboxylic acid, carboxylic acid ester, carboxylic acid amide, or carboxylic acid salt groups may be employed. Such methods are well-known and are described, for example, in March, *Advanced Organic Chemistry: Reactions, Mechanisms, and Structure* McGraw-Hill, 1977.

For example, the anhydride-containing copolymer may be reacted with a strong base such as an alkali metal or alkaline earth hydroxide or ammonium hydroxide to hydrolyze the anhydride functional groups to carboxylic acid salts. In a preferred embodiment of this invention, this reaction may be represented as follows:

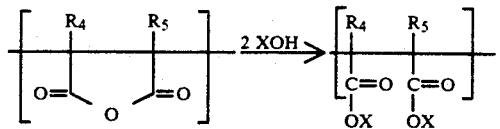

wherein $R_4$ and $R_5$ are the same or different and are independently selected from the group consisting of hydrogen and $C_1-C_6$ alkyl and X is ammonium ($NH_4$) or an alkali metal such as sodium or potassium. This neutralization is most preferably accomplished by dissolving the parent copolymer in an appropriate solvent such as water and combining the copolymer solution with an aqueous solution of the hydroxide. The degree of neutralization desired can be readily adjusted by controlling the number of equivalents of strong base added per equivalent of anhydride in the parent copolymer. A fully neutralized copolymer would require at least two equivalents of hydroxide per equivalent of anhydride. The copolymer product containing pendent carboxylate salt groups may be isolated and purified if desired by any conventional technique such as extraction or solvent-nonsolvent precipitation.

Alternatively, the anhydride functional groups in the parent copolymer may be converted to carboxylic acid amides by reaction with ammonia or a primary or secondary amine. This reaction may be represented as follows for a preferred embodiment of this invention:

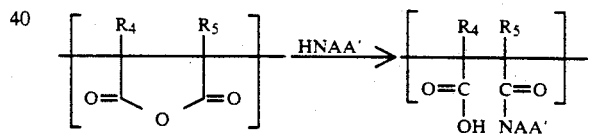

wherein $R_4$ and $R_5$ are the same or different and are independently selected from the group consisting of hydrogen and $C_1-C_6$ alkyl and A and A' are the same or different and are independently selected from the group consisting of hydrogen and $C_1-C_6$ alkyl. $R_4$, $R_5$, A, and A' may also be aryl, alkylaryl, haloaryl, or aralkyl, as well as any other organic substituent.

The anhydride may also be hydrolyzed under acidic conditions to yield carboxylic acid functional groups. This reaction may be illustrated as follows:

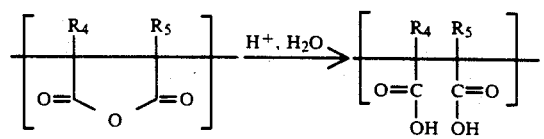

Acidification of the parent copolymer will convert the sulfonate salt groups present to sulfonic acid groups:

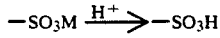

Partial acidification will, of course, result in a copolymer containing both sulfonate salt and sulfonic acid groups.

Reaction of the anhydride functionality with an alcohol will yield a dicarboxylate moiety containing both a carboxylic acid ester group and a carboxylic acid. The reaction may be catalyzed by either acid or base. This synthetic transformation may be characterized in a preferred embodiment as follows:

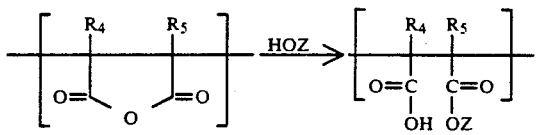

wherein Z is most preferably a $C_1$-$C_6$ alkyl group or an aryl group.

Due to their high solubility in water and the high proportion of sulfonate salt functional groups present, the alternating copolymers of this invention may be used as dispersing agents in water-based drilling fluid compositions. Drilling fluid compositions are commonly employed when drilling subterranean wells such as oil or gas wells. Dispersing agents are added to such drilling fluid compositions in order to disperse the drilling fluid, reduce the rate of filtrate loss, stabilize clays, flocculate drilled solids, increase carrying capacity, emulsify, lubricate, and the like.

Without further elaboration, it is believed that one skilled in the art can, using the preceding description, utilize the present invention to its fullest extent. The following examples, therefore, are to be considered as merely illustrative and not limitative of the claims or remainder of the disclosure in any way whatsoever.

EXAMPLE 1

Copolymerization of Sodium Methallylsulfonate and Maleic Anhydride

The polymerizaton was performed under an argon atmosphere. A five liter glass reactor equipped with a mechanical stirrer, thermometer and reflux condenser was charged with recrystallized sodium methallylsulfonate (540 grams, 3.4 moles), recrystallized maleic anhydride (345 grams, 3.5 moles) and 3 liters of glacial acetic acid containing 3 grams of acetic anhydride (previously saturated with nitrogen for 20 minutes). Nitrogen was bubbled through this stirring mixture for 30 minutes. The reaction mixture was heated to 72° C. to form a bright yellow solution. The initiator, AIBN (azobisisobutyrylnitrile), was added as a solid in one portion (5 grams). After reacting at 72° C. for 24 hours, another six grams of AIBN was added. The reaction mixture was allowed to react at 72° C. for 48 more hours. A third portion of AIBN (6 g) was added and the mixture heated for another 24 hours at 72° C. The glacial acetic acid was then removed by distillation to give brown solids to which three liters of THF (tetrahydrofuran) were added. The resulting solids were filtered and dried in a vacuum oven (1 torr) at 80° C. to give 770 grams of material which was found to be a mixture of the anhydride copolymer and about 25 weight percent sodium methallyl sulfonate monomer. The copolymer was determined to be an alternating 1:1 copolymer of maleic anhydride and sodium methallyl sulfonate having the structure:

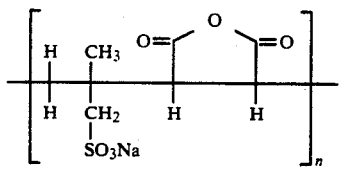

by $^{13}C$ nuclear magnetic resonance spectroscopy and elemental analysis.

EXAMPLE 2

Conversion of the Sodium Methallylsulfonate/Maleic Anhydride Copolymer to the Sodium Dicarboxylate Derivative The sodium methallylsulfonate/maleic anhydride copolymer (770 grams) from Example 1 was charged into a three liter glass reactor equipped with a mechanical stirrer and thermometer and dissolved in 800 milliliters of deionized water. To this solution sodium hydroxide (320 grams, 8 moles) in 350 milliliters of deionized water was added to pH 10 while keeping the temperature below 45° C. After the reaction mixture was allowed to react for an additional 30 minutes, the fully neutralized copolymer was precipitated by adding the aqueous solution to eight liters of methanol with stirring. The solids were filtered, washed with methanol and dried in a vacuum oven (1 torr) at 80° C. to constant weight to give 640 grams of copolymer. These solids had a peak molecular weight by gel permeation chromatography (sulfonated polystyrene calibration standards) of 3000 and contained less than five percent by weight monomers. The $^{13}C$ NMR and elemental analyses indicated that the product had a 1:1 alternating copolymer structure:

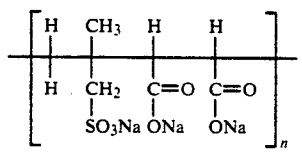

COMPARATIVE EXAMPLE 3

Copolymerization of Sodium Methallylsulfonate and Maleic Acid Disodium Salt

This example shows that a 1:1 alternating copolymer of an olefinically unsaturated sulfonate salt and a non-cyclic derivative of an $\alpha$, $\beta$-unsaturated dicarboxylic anhydride cannot be prepared by reaction of the two monomers in the presence of a free radical initiator.

The polymerization was performed under argon. A one liter glass reactor equipped with a mechanical stirrer and a thermometer was charged with recrystallized sodium methallylsulfonate (120 grams, 0.75 mole), maleic acid disodium salt (134 grams, 0.75 mole) and 400 milliters of deionized water which was previously saturated with nitrogen for 20 minutes. Nitrogen was then bubbled through this homogeneous solution for 30 minutes and then heated to 85° C. The initiator, AIBN (8 grams), was added as a solid to the reaction mixture at 85° C. After four hours an additional eight grams of AIBN was added and the reaction mixture was allowed to react for 16 more hours at 85° C. The reaction mixture was cooled to 50° C. and then poured into two liters of methanol with stirring. The white precipitate was filtered, washed with methanol and dried in a vacuum oven (1 torr) at 80° C. to constant weight (125 grams). These solids exhibited a bimodal molecular weight distribution by GPC. (peak molecular weights of 1400 and 2000). The $^{13}$C NMR showed less than 10 weight percent incorporation of the sodium methallylsulfonate monomer into the polymer. This example demonstrates that the use of a salt of an α, β-unsaturated dicarboxylic acid rather than an anhydride in a copolymerization with an olefinically unsaturated sulfonate salt does not yield an alternating 1:1 copolymer.

EXAMPLE 4

Copolymerization of Sodium Methallylsulfonate and Maleic Anhydride

A 150 mL reactor was charged with recrystallized sodium methallylsulfonate (9 grams, 0.57 mole), recrystallized maleic anhydride (5.2 grams, 0.53 mole) and 40 grams of glacial acetic acid. The reaction mixture was degassed by freeze-thawing three times under vacuum. Argon was inletted and 840 mg of AIBN added. The reaction mixture was heated in an oil bath at 80° C. for 18 hours. About half of the acetic acid was removed by distillation; 40 mL of ethylbenzene was then added while stirring the reaction product to form a precipitate. The precipitate was filtered and washed once with ethylbenzene and twice with hexanes. The anhydride copolymer was dried in a vacuum oven at 60° C. until a constant weight of 15 grams was obtained.

EXAMPLE 5

Conversion of the Anhydride Copolymer of Example 4 to the Corresponding Sodium Salt The copolymer obtained in Example 4 (15 g) was dissolved in 20 grams of deionized water and sodium hydroxide (4 grams, 0.1 mole) dissolved in 10 grams of water was added to the polymer solution to pH 11. This solution was added with stirring to 500 mL of methanol. The precipitated polymer was isolated by filtration and washed with methanol and dried in a vacuum oven at 80° C. to a constant weight of 12 grams. The structure of the alternating copolymer thus formed was:

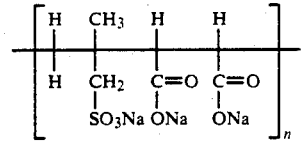

EXAMPLE 6

Copolymerization of Sodium Allylsulfonate and Maleic Anhydride

A 150 mL reactor was charged with sodium allylsulfonate (7.6 g; 0.053 mole), recrystallized maleic anhydride (5.2 g; 0.053 mole) and glacial acetic acid (30 g). The reaction mixture was degassed by freeze-thawing three times under vacuum. Nitrogen was introduced after the last thaw cycle; AIBN (640 mg) was then added. The reaction mixture was heated in an oil bath at 80° C. for 20 hours. To isolate the copolymer product, approximately one half of the acetic acid was removed by distillatin and 40 mL of ethylbenzene added with agitation of the reaction product to yield a precipitate. The precipitate was filtered, washed with ethyl benzene once, and washed with hexanes twice. The recovered copolymer was dried in a vacuum oven at 60° C. (1 torr) until a constant weight of 12 g (94% yield) was obtained. Analysis of the product by GPC. indicated the copolymer had a peak molecular weight of 3500 relative to sulphonated polystyrene calibration standards.

EXAMPLE 7

This example illustrates the preparation of a 1:1 alternating copolymer of sodium vinyl sulfonate and citraconic anhydride. A two liter glass reactor equipped with a mechanical stirrer and thermometer is charged with sodium vinyl sulfonate (130 g; 1.0 mole), citraconic anhydride (112 g; 1.0 mole), and anhydrous dimethyl formamide (750 g). After bubbling nitrogen through the stirred mixture for 30 minutes, the mixture is heated at 80° C. until the comonomer dissolve in the dimethyl formamide. A 2.4 g portion of 2,2'-azo-bis(2-methylbutane nitrile) is then added and the resulting mixture heated 24 hours at 100° C. under a nitrogen atmosphere. Approximately one-half of the solvent is removed under reduced pressure and the copolymer product precipitated from solution by addition of toluene. The precipitate is recovered by filtration, washed with additional toluene, and dried to constant weight in a vacuum oven. The structure of the alternating copolymer thus obtained, having a peak molecular weight of between about 1500 and 6000, is

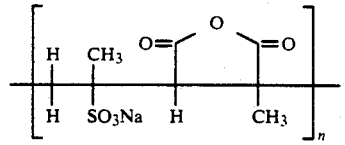

EXAMPLE 8

The preparation of a 1:1 alternating copolymer of potassium allylsulfonate and ethyl maleic anhydride using the process of this invention is shown by this example. A three liter glass reactor equipped with a mechanical stirrer and thermometer is charged with potassium allylsulfonate (160 g; 2.0 mole), ethyl maleic anhydride (126 g; 1.0 mole), and anhydrous propionic acid (1100 g). After bubbling argon through the stirred mixture for 30 minutes, 1,1'-azo-1-cyclohexane carbonitrile (5.7 g) is added and the mixture heated 36 hours at 90° C. under an argon atmosphere. Approximately one-half of the solvent is removed under reduced pressure and the copolymer product precipitated from solution by the addition of diethyl ether. The precipitate is recovered by filtration, washed with additional diethyl ether, and then dried to constant weight in a vacuum oven. The structure of the alternating copolymer thus obtained, having a peak molecular weight of between about 1500 and 6000, is

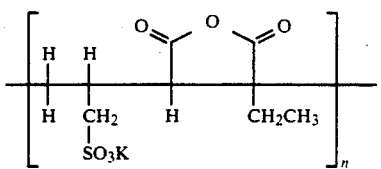

EXAMPLE 9

This example illustrates the preparation of an alternating copolymer of sodium 2-phenyl allylsulfonate, maleic anhydride, and citraconic anhydride using the process of this invention. A two liter glass reactor equipped with a mechanical stirrer and thermometer is charged with sodium 2-phenyl allyl sulfonate (220 g; 1.0 mole), maleic anhydride (49 g; 0.5 mole), citraconic anhydride (56 g; 0.5 mole), and diethyl formamide (650 g). After purging the reaction vessel with nitrogen, 2,2'-azo bis-(2-acetoxy propane) (16.25 g) is added and the resulting mixture heated 12 hours at 110° C. under nitrogen. Approximately one-half of the solvent is removed under reduced pressure and the copolymer product precipitated from solution by addition of hexane. The precipitated copolymer is recovered by filtration, washed with additional hexane, and then dried to constant weight in a vacuum oven. The structure of the alternating copolymer thus obtained, having a peak molecular weight of between about 1500 to 6000, is

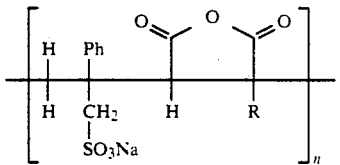

wherein about 50 percent of the R groups are hydrogen and about 50 percent of the R groups are methyl.

I claim:

1. A copolymerization process which comprises reacting at a temperature of from about 50° C. to 125° C. in the absence of water approximately equimolar amounts of
   (a) an α, β-unsaturated dicarboxylic acid anhydride having the general structure:

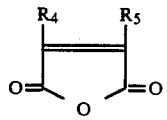

wherein $R_4$ and $R_5$ are the same or different and are independently selected from the group consisting of hydrogen, aryl, and $C_1$-$C_6$ alkyl; and (b) an olefinically unsaturated sulfonate salt having the general structure:

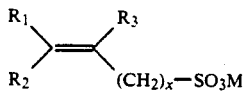

wherein $R_1$, $R_2$, and $R_3$, are the same or different and are independently selected from the group consisting of hydrogen, aryl and $C_1$-$C_6$ alkyl, x is 0, 1, or 2, and M is an alkali metal, alkaline earth, or ammonium;

dissolved in an non-reactive polar organic solvent selected from acetic acid and dimethyl formamide in the presence of an effective amount of an azo initiator to form a substantially alternating copolymer containing approximately equimolar amounts of α, β-unsaturated dicarboxylic anhydride recurring polymerized units and olefinically unsaturated sulfonate salt recurring polymerized units and having a peak molecular weight of from about 1500 to 6000.

* * * * *